United States Patent [19]

Kohno

[11] 4,003,346
[45] Jan. 18, 1977

[54] ROTARY PISTON INTERNAL COMBUSTION ENGINE

[75] Inventor: Toshiyuki Kohno, Toyoake, Japan

[73] Assignee: Toyota Jidosha Kogyo Kabushiki Kaisha, Japan

[22] Filed: Oct. 15, 1974

[21] Appl. No.: 514,906

[30] Foreign Application Priority Data

June 24, 1974 Japan .............................. 49-71426
July 11, 1974 Japan .............................. 49-78721

[52] U.S. Cl. .............................................. 123/8.13
[51] Int. Cl.² ........................................ F02B 53/04
[58] Field of Search ...................... 123/8.09, 8.13

[56] References Cited
UNITED STATES PATENTS

| 1,568,052 | 1/1926 | Bullington | 123/8.13 |
| 3,136,302 | 6/1964 | Nallinger et al. | 123/8.13 |
| 3,491,729 | 1/1970 | Lamm | 123/8.13 |
| 3,565,049 | 2/1971 | Bauer | 123/8.13 |
| 3,780,707 | 12/1973 | Cole | 123/8.13 |
| 3,805,747 | 4/1974 | Nakagawa et al. | 123/8.13 |
| 3,915,126 | 10/1975 | Kishimoto | 123/8.13 |

FOREIGN PATENTS OR APPLICATIONS 993,769 6/1965 United Kingdom .............. 123/8.13

*Primary Examiner*—C. J. Husar
*Assistant Examiner*—Leonard E. Smith
*Attorney, Agent, or Firm*—Toren, McGeady and Stanger

[57] ABSTRACT

A rotary engine having a housing defining an internal rotor chamber between a trochoidally shaped peripheral wall and a pair of side walls is provided with a peripheral port through which a rich air-fuel mixture is supplied, and a side port, through which air is supplied, with the side port being arranged forwardly of the peripheral port taken in the direction of rotor rotation. The peripheral port opens into the combustion chamber of the engine through the peripheral wall and the side port opens through one of the side walls. The degree of opening of the side port changes in accordance with rotor rotation and when the rotor is within a certain angular range following the top dead center position during the intake stroke of its rotational cycle, both ports are open into the combustion chamber defined between the housing and the rotor.

6 Claims, 7 Drawing Figures

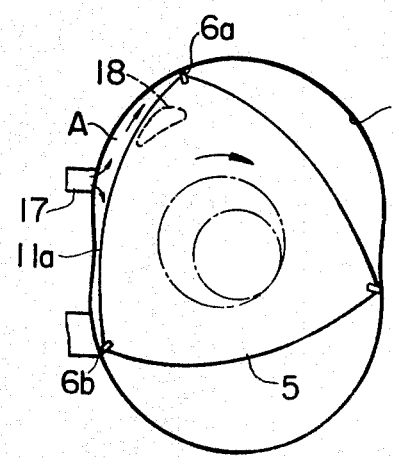
FIG. 3a
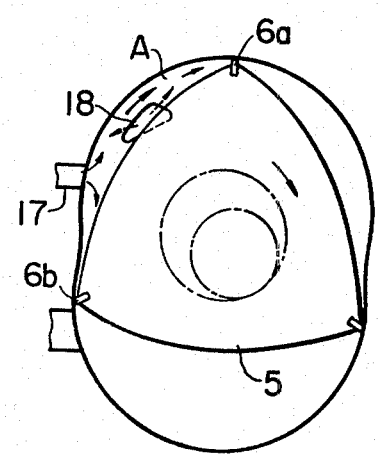
FIG. 3b
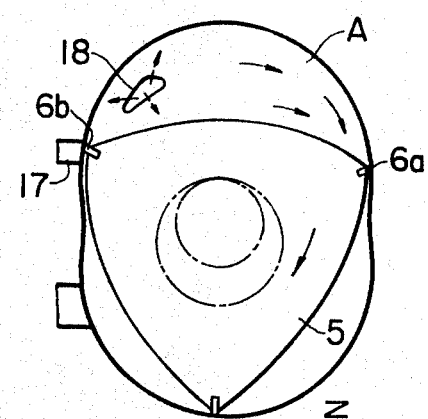
FIG. 3c
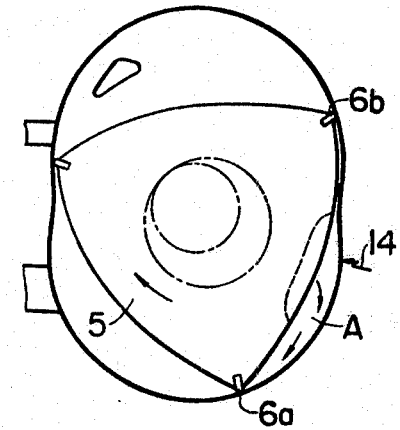
FIG. 3d
FIG. 4
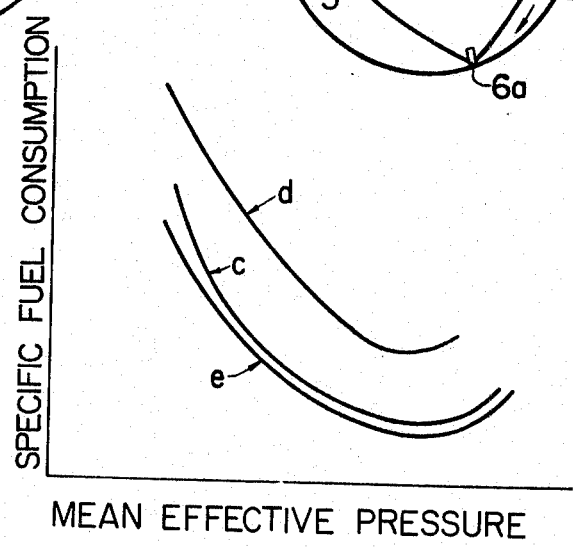

ROTARY PISTON INTERNAL COMBUSTION ENGINE

BACKGROUND OF THE INVENTION

The present invention relates generally to internal combustion engines of the rotary piston type and more particularly to an engine of this type having a trochoid structure.

Generally, in rotary engines, the flame of the fuel mixture ignited by the spark plug of the engine propagates through the combustion chamber at high speed toward the leading side thereof taken in the direction of rotor rotation as a result of mixture flow induced by rotation of the rotor. However, the flame is slow in propagating toward the trailing side of the combustion chamber. As a result, although the mixture in the combustion chamber is adequately burned toward its leading side, imperfect combustion occurs on the trailing side resulting in deteriorating combustion efficiency and increasing fuel consumption. Additionally, the discharge of harmful components such as HC and CO is increased due to the release of residual unburned components.

The present invention is devised with the intent of eliminating the aforementioned disadvantages.

SUMMARY OF THE INVENTION

Briefly, the present invention may be defined as a rotary engine of the type comprising a rotor housing defining interiorly thereof a rotor chamber which is enclosed by a trochoidally shaped peripheral wall and a pair of side walls. A rotor is mounted within the rotor chamber for rotation in a given direction and the peripheral wall is shaped to include a pair of short-axis portions each having a leading end taken in the direction forwardly of rotor rotation. A peripheral port is provided in one of the short-axis portions at the leading end thereof. The peripheral port opens into the rotor chamber through the peripheral wall and is arranged to supply a rich air-fuel mixture. A side port is provided in one of the side walls through which air may be supplied. The side port is located in the side wall at a position proximate the peripheral port but spaced forwardly thereof taken in the direction of rotor rotation. The arrangement of the ports and of the rotor is such that both ports will be opened into the combustion chamber defined between the housing and the rotor when the rotor is within a certain predetermined angular range after passing the top dead center position during the intake stroke of its rotational cycle. As a result of the location of the side port and of the rotor structure, the opening of the side port varies in accordance with the rotor rotation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIGS. 3a to 3d are diagrams illustrating the various stages of operation of the engine with the rotor at different angular positions;

FIG. 4 is a graph illustrating characteristics of engine specific fuel consumption.

DETAILED DESCRIPTION OF THE PREFERRED EMBODIMENT

Figure 1:
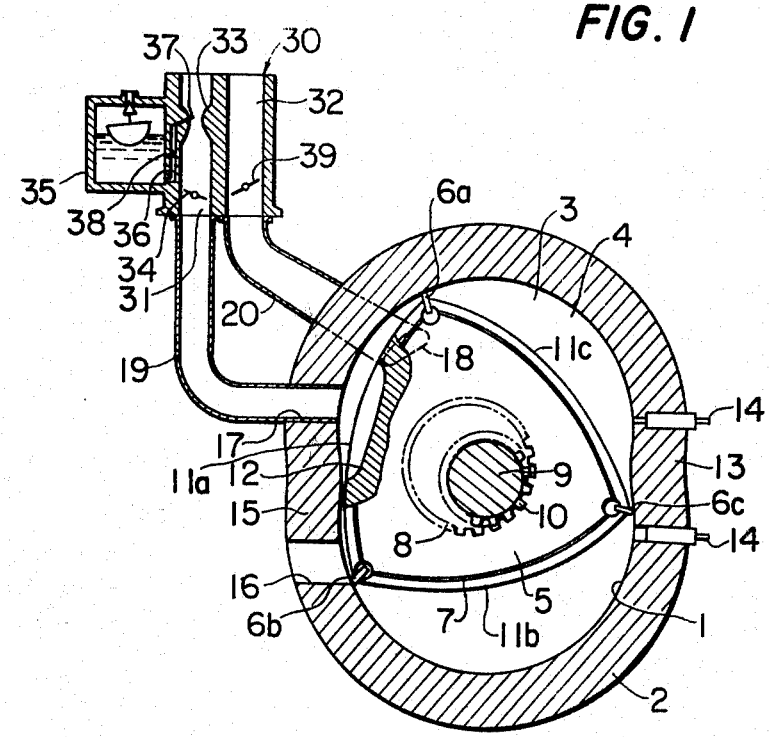
FIG. 1 is a sectional schematic diagram of a rotary engine according to the present invention.

Referring to FIG. 1, there is shown a rotary engine assembly comprising a triangular rotor 5 arranged for eccentric rotation within a rotor housing 2 defining therein a rotor chamber between an interior peripheral wall 1 formed with a trochoidal curvature and a pair of side walls, with one side wall 4 being visible in the view of FIG. 1. The side wall 4 comprises a flat interior face 3 and the rotor 5 is formed with three apices each having an apex seal 6a–6c which contact the peripheral wall 1 during rotation of the rotor. The rotor also includes side seals 7 provided on the side faces thereof which are arranged to contact the side faces 3 of the side walls 4.

An internal gear 8 meshed with a gear 10 on an eccentric shaft 9 operates to cause eccentric rotor rotation. The rotor includes three arcuate contoured faces 11a–11c having formed at their center a combustion chamber recession 12.

The housing 2 is provided with a pair of short-axis portions 13 and 15 forming, respectively, short axis peripheral wall portions 1a and 1b. Spark plugs 14 are provided in one of the short-axis portions 13 extending to the interior of the rotor chamber through the peripheral wall 1 of the rotor housing 2.

A discharge port 16 is provided on the other short-axis portion 15 at a position at the trailing end thereof, taken in the direction of rotor rotation. That is, the rotor 5 shown in FIG. 1 rotates in a clockwise direction and it will be understood that the trailing end of the short-axis portion 15 is that end thereof located rearwardly of the portion 15 with reference to the direction of rotor rotation while the forward or leading end of the short-axis portion 15 is that end located forwardly thereof taken in the direction of rotor rotation.

While the discharge port 16 is located at the trailing end of the short axis portion 15, a peripheral port 17 is provided at a location at the leading end of the short-axis portion 15. It will be seen that port 17 extends through the housing 2 and opens at the peripheral wall 1 into the interior of the housing.

A side port opening into the interior of the housing through the side face 3 is located at a position forwardly of the peripheral port 17 taken in the direction of rotor rotation.

The port 17 is connected to a fuel mixture supply passage 31 and the port 18 is connected to an air supply passage 32. The passages 31 and 32 located in a carburetor 30 are connected to ports 17 and 18 through suction pipes 19 and 20, respectively. In the fuel mixture supply passage 31 there is provided, in the manner of an ordinary carburetor, a venturi 33, a throttle valve 34, and a nozzle 37 for injecting fuel from a float chamber 35 through a passage 36 in order to form an air-fuel mixture which may be guided to the peripheral port 17. It should be noted that a jet 38 is provided mid-way in the passage 36 to produce a richer mixture which is greater in terms of the air-fuel ratio than the theoretical ratio.

In the air supply passage 32 there is provided a throttle valve 39 which is operatively connected to the throttle valve 34 in order to guide only air from an air cleaner (not shown) to the side port 18 by operation of the suction force of the engine.

During the operating cycle of the engine, depicted in FIGS. 3a–3d, in the first half period of the suction stroke, the peripheral port 17 is open as the apex seal 6a passes the port 17, as shown in FIG. 3a. Thereby, the rich fuel mixture from the mixture supply passage 31 of the carburetor 30 is supplied into a combustion chamber A defined between the arcuate face 11a of the rotor and the peripheral wall 1 of the rotor housing. The mixture is forced to flow toward the leading side of the face 11a in the direction of the apex seal 6a with rotation of the rotor 5.

When, due to its eccentric rotation, the rotor 5 advances further past the top dead center position during the intake stroke of its operating cycle, the side port 18 is gradually or progressively opened as the side seal 7 passes thereover, as shown in FIG. 3b. Air from the air supply passage 32 of the carburetor 30 is thereby gradually increased in flow rate and supplied in increasing quantities into the combustion chamber A.

When the peripheral port 17 is closed by passage thereover of the apex seal 6b to stop supply of the rich fuel mixture into the combustion chamber, as shown in FIG. 3c, the side port 18 will be fully opened and will admit a large amount of air alone into the combustion chamber A. By this time, the leading end of the combustion chamber A is already filled with a large quantity of the rich fuel mixture so that the air supplied through the side port 18, during the time that the side port 18 is opened and prior to its closure by the side seal 7, is amassed in the trailing end of the combustion chamber toward the apex seal 6b where the quantity of rich fuel mixture is relatively small. With the combustion chamber A being thus filled with a rich mixture in the leading end thereof, and with air accumulated in the trailing end, both being in stratified form, the gaseous mixture is then compressed with further advancement of the eccentric rotation of the rotor 5. Toward the end of the compression stroke, the mixture is ignited by the spark plugs 14, as shown in FIG. 3d whereby only the rich mixture in the leading end of the combustion chamber is completely burned with propagation of the flame to the leading end occurring in order to develop the rotative force upon the rotor 5. The combustion which occurs involves substantially no combustion in the trailing end of the combustion chamber where the air is present. The burned gas is discharged out of the housing through the discharge port 16 by further rotation of the rotor 5.

Figure 2:
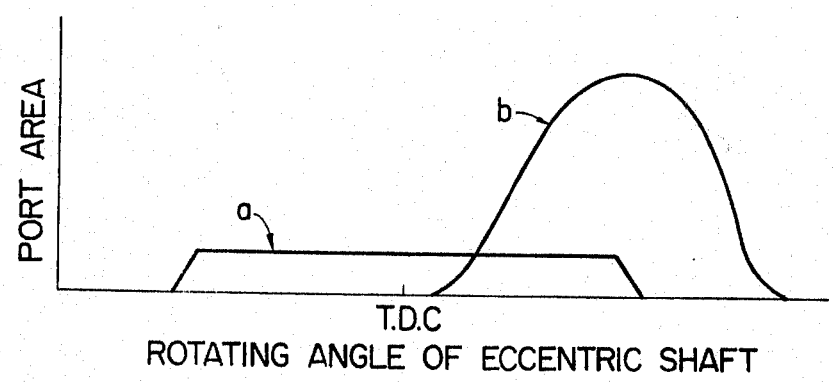
FIG. 2 is a graphical illustration of the relationship between the angle of rotation of the rotor and the opening of the engine ports.

Certain operating characteristics of the engine whereby the aforementioned effects are produced are depicted in FIG. 2. During rotation of the rotor 5, the opening of the peripheral port 17 is maintained at a relatively small constant value before and after the top dead center position of the rotor on the intake stroke, as shown by the curve a in FIG. 2. The opening of the side port 18 increases sharply after the angle of rotation of the eccentric shaft 9 passes the top dead center position of the intake stroke. This opening reaches a maximum value, several times as large as the opening of the peripheral port 17, toward the time when the peripheral port 17 closes, and it is again reduced sharply after closure of the port 17, as shown by the curve b in FIG. 2.

Thus, as previously described, in accordance with the present invention, combustion is performed only in the leading end of the combustion chamber A where the combustible rich mixture is present while substantially no combustion takes place in the trailing end where substantially air alone exists. Thus, there occurs little fuel wastage which would otherwise be caused by residual unburned components.

Results of experiments have shown that the fuel consumption was greatly reduced in a manner depicted by the curve c in FIG. 4. This shows a marked improvement as compared with the fuel consumption of a conventional rotary engine which is depicted by the curve d in FIG. 4 and is comparable to the fuel consumption of a reciprocating engine shown by the curve e. Decreasing the unburned components in the combustion gas of a fuel naturally results in a reduction of such harmful components as CO and HC in exhaust gas. This operates to great advantage when measures are taken to avoid the discharge of harmful components in exhaust gas. Furthermore, since the device of the present invention operates such that a rich mixture and air are arranged in stratified form by availing of the gas flow caused by rotation of the rotor 5, the structures of the carburetor 30 and of the engine body may be formed in a more simplified fashion.

While a specific embodiment of the invention has been shown and described in detail to illustrate the application of the inventive principles, it will be understood that the invention may be embodied otherwise without departing from such principles.

What is claimed is:

1. A rotary engine comprising, in combination, a rotor housing defining interiorly thereof a rotor chamber enclosed by a trochoidally shaped peripheral wall and a pair of side walls, a rotor mounted for rotation in a given direction within said rotor chamber, said peripheral wall including a pair of short-axis portions each having a leading end taken in a direction forwardly of rotor rotation, a peripheral port extending through one of said short-axis portions at the leading end thereof and opening into said rotor chamber through said peripheral wall, a side port opening into said rotor chamber through one of said side walls, said rotor operating to open and close said side port and said peripheral port during rotation thereof, said side port being located proximate said peripheral port forwardly thereof taken in the direction of rotor rotation with said side port being arranged relative to said peripheral port to remain open for a period of time after closing of said peripheral port during rotation of said rotor, means for delivering a fuel mixture into said rotor chamber through said peripheral port and means for delivering air into said rotor chamber through said side port.

2. An engine according to claim 1 wherein said rotor is structured to progressively increase and decrease said side port opening between a completely opened and a completely closed condition during rotor rotation with the degree of opening of said side port varying in dependence upon the position of said rotor.

3. An engine according to claim 2 wherein said rotor includes a plurality of apices having seals thereat adapted to engage said peripheral wall during rotation of said rotor and a rotor side wall extending between each pair of said apices, with a combustion chamber being defined between each rotor side wall and said peripheral wall between each pair of said apices, said peripheral port and said side port being arranged to be in the open condition simultaneously into a single combustion chamber during at least a given phase of rotor rotation.

4. An engine according to claim 3 wherein said rotor is arranged to rotate through an engine cycle which includes a top dead center position on its intake stroke and wherein said peripheral port and said side port are both in the open condition into a single combustion chamber during rotation of said rotor through an angular range following said top dead center position.

5. An engine according to claim 3 including a sealing member positioned on said rotor for sliding contact with said side wall having said side port opening therethrough, said sealing member operating to pass over said side port opening to effect opening and closure of said side port to said combustion chamber.

6. An engine according to claim 3 wherein said apex seals operate to open and close said peripheral port to the combustion chamber of said engine during rotation of said rotor, with flow communication from said peripheral port being restricted to a combustion chamber defined between a pair of apex seals adjacent said peripheral port and located on opposite sides thereof along said peripheral wall.

* * * * *